Nov. 3, 1970 L. GASSER ET AL 3,538,262

CIRCUIT ARRANGEMENT TO FORWARD DIAL INFORMATION IN EXCHANGE SYSTEMS WITH DIRECT DISTANCE DIALLING OF TELECOMMUNICATION, PARTICULARLY TELEPHONE SYSTEMS

Filed Aug. 18, 1967 3 Sheets-Sheet 1

CIRCUIT ARRANGEMENT TO FORWARD DIAL INFORMATION IN EXCHANGE SYSTEMS WITH DIRECT DISTANCE DIALLING OF TELECOMMUNICATION, PARTICULARLY TELEPHONE SYSTEMS

Filed Aug. 18, 1967 3 Sheets-Sheet 3

3,538,262
Patented Nov. 3, 1970

3,538,262

CIRCUIT ARRANGEMENT TO FORWARD DIAL INFORMATION IN EXCHANGE SYSTEMS WITH DIRECT DISTANCE DIALLING OF TELECOMMUNICATION, PARTICULARLY TELEPHONE SYSTEMS

Lorenz Gasser, Stuttgart, and Dieter Schadewald, Merklingen, Germany, assignors to International Standard Electric Corporation, New York, N.Y., a corporation of Delaware Filed Aug. 18, 1967, Ser. No. 661,638
Claims priority, application Germany, Aug. 23, 1966, St 25,788
Int. Cl. H04m 3/02
U.S. Cl. 179—18 7 Claims

ABSTRACT OF THE DISCLOSURE

In telephone systems in which, besides the conventional dial-switch telephone sets, also audio-frequency key dialling telephone sets are connected, a dial pulse receiving device (register) is connected, which register, if the calling subscriber has a telephone set with a dial switch, is switched off at the first pulse. If the subscriber has a key-dialling telephone set (frequency code) the register is held operative and the DC-loop leading to the first selector stage is split into two partial loops. The telephone set of the subscriber is powered from the register.

Figure 1:
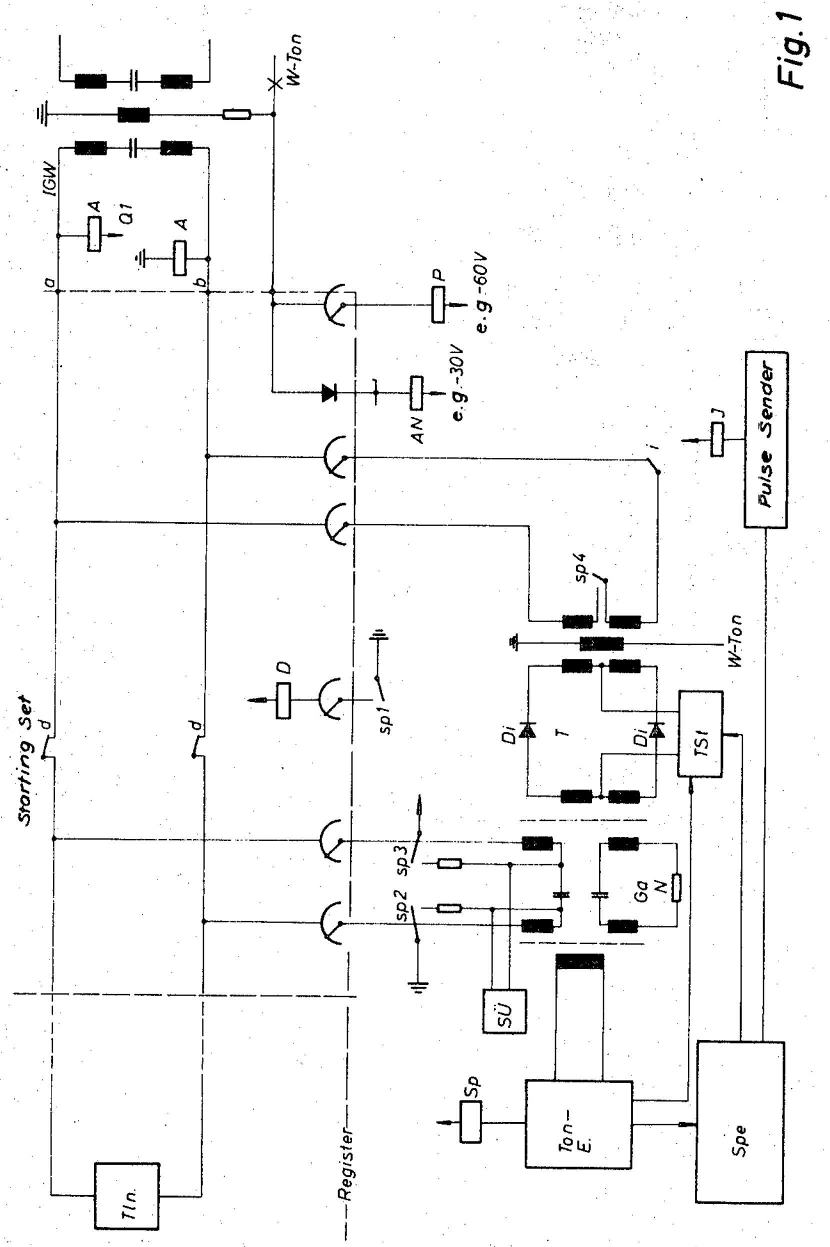

The invention relates to a circuit arrangement in telecommunication, particularly telephone exchanges in which selectors can be set in a stepping manner through dial switch signals and to which subscriber sets can be connected with dial switches as well as with keys for voice-frequency signal dialling in an arbitrary distribution and in which moreover, a register can be connected when seized.

The signalling with frequency controlling keys differs so greatly from the conventional way of dialling that particular measures and devices are required in order to operate subscriber sets with dialling keys and with a dial switch from a common exchange.

A known type of signalling using dialling keys is the one with audio-frequencies, i.e., the dial signals are represented in a coded way through one or through a combination of defined audio-frequencies. With these dial signals a direct control of the connecting elements in conventional exchanges is impossible. Therefore separate devices must be provided when connecting subscriber sets with audio-frequency signalling to an exchange with direct dialling, which devices receive and evaluate the audio-frequency dialling signals and convert those signals into a suitable form to set the selectors, i.e., into pulse trains.

Particular difficulties occur when connecting subscriber sets with voice-frequency signalling, if these subscriber sets shall be connected to an exchange in an arbitrary distribution and in common with subscriber sets having dial switches.

Prior art arrangements are known wherein after the arrival of dial information a circuit arrangement determines whether frequency code signals or dial pulses are at hand. The circuit arrangement modifies the code of the information received and leads the said information to a register. This arrangement is preferably used in indirectly controlled exchange systems.

In direct dialling systems this known method causes unaccustomed delays when establishing a connection for subscribers having a dial-switch set. The relay occurs because the emitted pulse trains do not control the selectors in steps, but are led to the selectors only after checking an intermediate storage.

Another known arrangement utilizes a system where in order to particularly identify the dial signals, a decrease of the loop current is also transmitted as a dial pulse supervising signal. After seizing and connecting a register, only the AC-component of the subscriber loop is disconnected and led over the register. A loop current decrease appears in both methods either when dialling is accomplished with a dial switch or with audio-frequency dialling keys. The current decrease occurs at the commencement of signalling and starts the selector to a first step. This first step, however, is not a genuine dialling signal when audio-frequency key dialling sets are used.

Besides the necessary facilities for converting the key dialling signals into pulse trains; additional switching means must be provided in the register, which reduce the pulse train corresponding to the first key dialling signal by one pulse. Another additional expenditure is caused by the time elapsing from the start of the current decrease to the arrival of the frequency code signal in a reducing element or in case of dial-switched telephone sets until the end of the loop current reduction.

It is the object of the invention to avoid the increased expenditure and consequently the possibility of troubles accruing therefrom and to provide a circuit arrangement which guarantees a safe discrimination between dial switch code signals and key dialling code signals, whereby the key dialling code signals are formed without a separate dial pulse supervising signal.

The invention is characterized in this that after connecting the register, the subscriber loop to the first collector stage remains through-connected, that the loop current decrease marking the start of signalling from a dial-switch-equipped telephone set can be evaluated as a criterion for releasing the register, and that when signalling with audio-frequency key-dialling telephone sets the subscriber loop can be separated into two separately fed partial loops.

According to a further embodiment of the invention a loop supervising device, arranged in the register, causes when using a dial-switch telephone set the release of the register. The device recognizes the loop current decrease indicating the start of dialling. When dialling with the aid of an audio-frequency key dialling set a first, register-fed DC-partial loop is led to the set of the calling subscriber and a second partial loop is led via the register to the first selector stage with the aid of a switching means, associated to the audio-frequency receiver of said register, whereby the subscriber loop is separated through a switching means arranged in the starting set of the subscriber loop. A contact is inserted into the second partial loop to forward the key dialling signals having been converted into pulse trains.

The reduction in expenditure compared to circuit arrangements known is clearly visible. For example, no additional trigger stages, no timing elements and no gates are required.

Another embodiment of the invention is characterized in this that when connecting the register and by the response of the loop supervising facility in the register through a switching means arranged in the starting set of the subscriber loop, said loop can be separated and through-connected via the register until the start of the signal train. When dialling with the dial switch the register can be switched off with the aid of the loop supervising device, which device recognizes the loop current decrease marking the start of the dialling with a dial switch. By the switch off of the switching means arranged in the starting set, the dial pulse sequence is led directly to the stepping selector.

Figure 2:
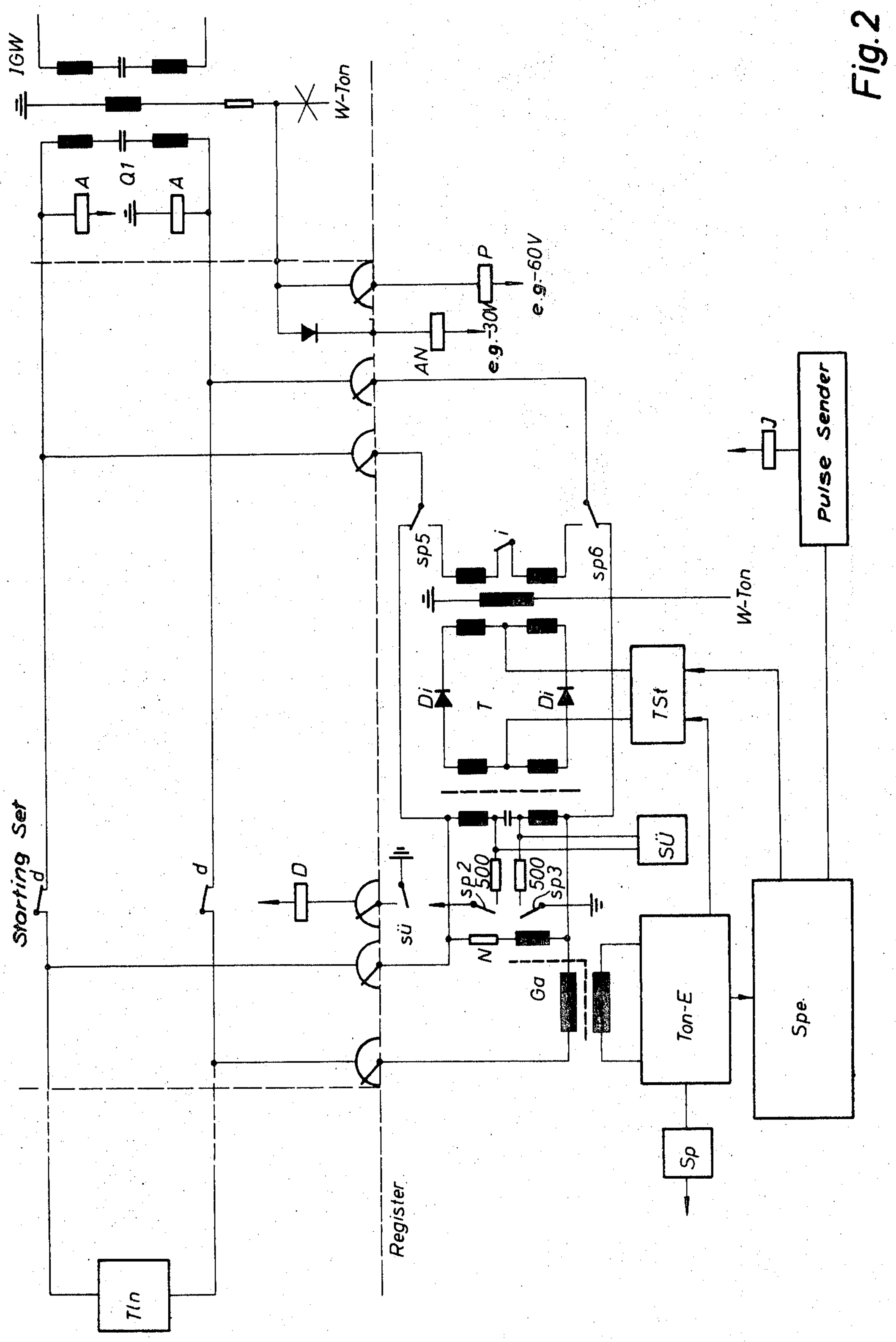
Figure 3:
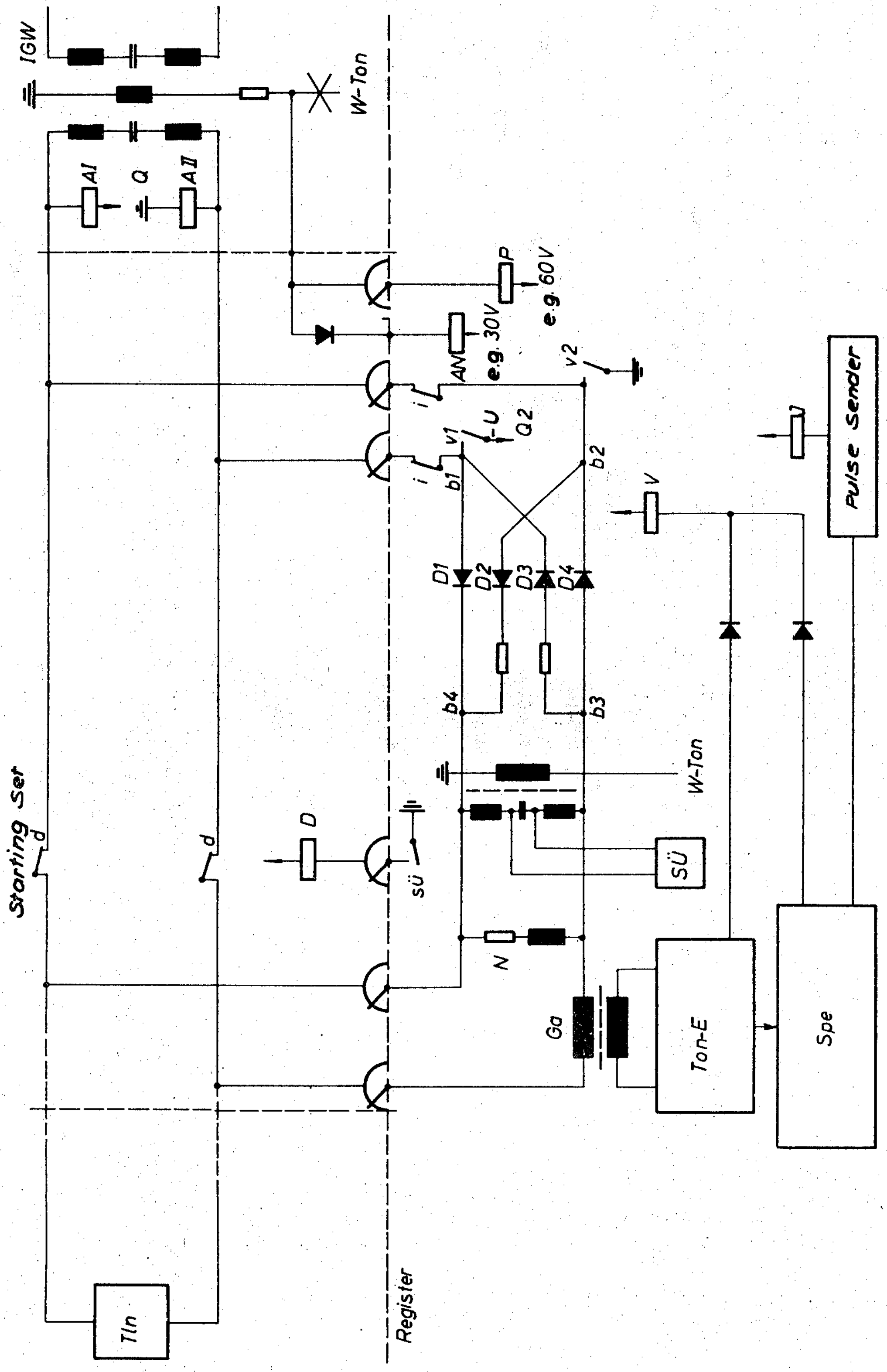

The invention is now described with the aid of examples shown in FIGS. 1 to 3.

As may be gathered from the FIGS. 1 to 3 both wires of the subscriber loop are separated at the input to the first selector stage I.GW, and a connecting set for the register is inserted; furthermore the dial tone wire must be separated in the first selector stage, because the dial tone is furnished by the register.

If a subscriber lifts the handset he seizes in a way known per se the first group selector I.GW. From the first group selector, i.e., the first selector stage, I.GW, the criterion is derived to start the register hunting selector and the register is assigned to the subscriber having called.

After connecting the register the subscriber receives proceed to dial tone from said register and he may start dialling. A four-wire termination GA, being symmetrical in FIG. 1 and asymmetrical in FIGS. 2 and 3, takes care that the dial tone of the dial tone generator W-T*on* reaches the audio-receiver T*on*-E of the register only weakened, thus being unable to start the speech immunity circuit, because otherwise the first frequency code signal could be suppressed if the dialling is made with audio-frequency key dialling.

If the calling subscriber has a dial-switch telephone set the loop supervising device SÜ (FIG. 1), arranged in the register, recognizes the loop current decrease going along with the first dial-switch pulse and causes, in a way not shown, the release of the register.

If the first digit, i.e., the frequency or frequency combination is recognized in the audio-frequency receiver T*on*-E (FIG. 1) when a subscriber having a key-dialling telephone set calls, said frequency or frequency combination is stored in the storage S*pe*. At the same time the sound receiver blocks a gate T via the gate control TS*t*, thus disconnecting the dial tone. Moreover, a switching means D is energized, arranged in the starting set simultaneously with the response of a switching means S*p*, associated to the sound receivers through its contact *sp*1, said switching means D separating the subscriber loop through its contact *d*.

The subscriber set T1*n* is powerful through contacts *sp*2 and *sp*3 of the switching means S*p* from the register in a first DC-partial loop, while the partial loop, leading to the first selector stage I.GW is closed through a contact *sp*4.

This switching occurs during the first key pressure, thus preventing the subscriber from being bothered by switching noise. The gate now remains blocked until the dial information in the storage has been read out. Thus the sound receiver cannot be impaired by the reading out of the converted dial information.

Because the links of the call number is unknown the register is disconnected through a device operating after a defined time. As the gate circuit is switched off after the storage has been emptied an AC-connection exists between both DC-partial loops so that answering of the called subscriber is not lost before the register is released.

FIG. 2 shows a further embodiment of the circuit arrangement according to the invention.

Differing from the circuit arrangement shown in FIG. 1 the subscriber loop is opened and led with the DC-side across the register through contacts *d* of a switching means D. Switching means D is energized through a contact *sü* of the loop supervising device SÜ. When a key dialling information is recognized gate T is blocked and the subscriber loop is divided into two DC-partial loops through the switch-over contacts *sp*5 and *sp*6. The partial loop leading to the subscriber set is powerfed from the register through contacts *sp*2 and *sp*3 as described above.

In the circuit arrangement shown on FIG. 3 the subscriber loop is also led across the register when connecting said register as described in the circuit arrangement shown on FIG. 2. In order to reduce the expenditure in transformers, a rectifier bridge-type circuit is inserted into the subscriber loop where it passes across the register separating to both partial loops. The bridge-type circuit operates as a blocking unit.

In the non-operative condition the subscriber loop passes from the voltage source in the first selector stage I.GW to the input *b*1, *b*2 of the bridge-type circuit via the windings AI and AII of the feeder relay A, across the branches of the bridge-type circuits with the diodes D1, D4, to the output *b*3, *b*4 of said circuit and from there to the subscriber set T1*n*. If a frequency code signal is recognized in the sound receiver T*on*-E and if the dialling signals, converted into pulse trains, are led from the storage S*pe* to the first selector stage via the pulse sender and the contacts *i* of the pulsing relay I, a relay V is energized simultaneously by the sound receiver T*on*-E or by the storage S*pe*, respectively. The relay V connects through its contacts *v*1 and *v*2 an additional voltage source Q2. The voltage −U is of opposite polarity to the feeder voltage, connected through the input *b*1, *b*2 of the bridge-type circuit. The amount of this voltage from said additional voltage source is selected thus that the diodes D1, D4 of the bridge-type circuit are non-conductive. The partial loop leading to the subscriber set is now power-fed through the additional voltage source via the printed-circuit branches with the diodes D2, D3 and the feed resistors RS. The feed relay A with its windings AI and AII remains energized by connecting the additional voltage source or it is deenergized in the rhythm of the pulsing relay E. The sound receiver remains uninfluenced by the processes occurring in the circuit leading to the first selector stage, because this circuit is shunted across the additional voltage source on its AC-side at the input of the bridge-type circuit.

Besides it is achieved thereby that the subscriber does not hear the switching noise caused by the pulsing contacts *i*.

While the principles of the invention have been described above in connection with specific apparatus and applications, it is to be understood that this description is made only by way of example and not as a limitation on the scope of the invention.

What is claimed is:

1. A circuit arrangement in telephone exchange systems wherein selector means are set responsive to dial originated signals, said arrangement including subscriber sets, loop means for connecting said subscriber sets to said selector means, said subscriber sets being equipped either with dial switches for providing dial pulse trains or with keys for providing audio frequency signals, register means for controlling calls originated at subscriber sets equipped with said keys, connecting set means for connecting said register means to said loop means at the start of a call while retaining said connection from said subscriber set through said loop means to said selector means, current level detecting means operated responsive to the reduction of loop current to indicate the start of a dial switch dialling operation, means responsive to the operation of said detecting means for releasing the said register means, means responsive to dialling with said audio frequency keys for dividing the subscriber loop into two separate partial loops, a first of said two separate partial loops being connected from said register means to a calling one of said subscriber sets, the second of said two separate partial loops being connected from said register means to said selector means, power transmitting means for transmitting power over said first partial loop from said register, audio frequency receiving means in said register for receiving said audio frequency signals, and means for converting said audio frequency signals into pulses for operating said selector means to affect the connection of said calling subscriber set to a called subscriber set.

2. The circuit arrangement according to claim 1 wherein contact means are provided in a second of said separate partial loops for forwarding the converted audio frequency signals to said selector means.

3. The circuit arrangement according to claim 2 wherein first switching means are provided for dividing the subscriber loop into said two separate partial loops, said first switching means being located in the connecting set means, and means responsive to the disconnection of said register for transmitting the dial pulse trains directly to the selector means.

4. The circuit arrangement according to claim 2 wherein second switching means are provided connected to said audio frequency receiving means, and wherein said power transmitting means includes bias voltage means connected under the control of said second switching means to the first partial loop.

5. The circuit arrangement according to claim 4 wherein means are provided in said both partial loops for isolating one from the other for direct current and for coupling one to the other over an alternating current coupling means.

6. The circuit arrangement according to claim 5 wherein gate circuit means are provided at the AC coupling of said both partial loops, and means for controlling said gate circuit responsive to the audio frequency signals received at said receiving means.

7. The circuit arrangement according to claim 4 wherein a first bias voltage is connected in the loop between the calling subscriber set and the selector means, blocking circuit means inserted into said second subscriber loop, said blocking circuit means comprising a rectifier bridge type circuit, means for connecting said first bias voltage across a first diagonal branch of said bridge circuit, means for coupling the subscriber set to a second diagonal branch of said rectifier bridge type circuit, and means responsive to dialling with the keys for connecting a second bias voltage having a polarity opposite to said first bias voltage to said first diagonal branch, and for forwarding pulse trains over contacts inserted into said second partial loop.

References Cited

UNITED STATES PATENTS

| | | |
|---|---|---|
| 3,133,155 | 5/1964 | Kuchas. |
| 3,328,530 | 6/1967 | Schildgen. |
| 3,329,775 | 7/1967 | Kurz. |
| 3,431,365 | 3/1969 | Siegel. |

RALPH D. BLAKESLEE, Primary Examiner

U.S. Cl. X.R.

179—16